A. HAMBURGER AND W. E. L. DAY.
APPARATUS FOR MAKING MULTICOLOR FILMS FOR CINEMATOGRAPHY.
APPLICATION FILED NOV. 25, 1919.

1,332,828.

Patented Mar. 2, 1920.

INVENTORS
A. Hamburger.
W.E.L. Day
BY
H.R.Kerslake ATTORNEY

A. HAMBURGER AND W. E. L. DAY.
APPARATUS FOR MAKING MULTICOLOR FILMS FOR CINEMATOGRAPHY.
APPLICATION FILED NOV. 25, 1919.
1,332,828.
Patented Mar. 2, 1920.
3 SHEETS—SHEET 2.
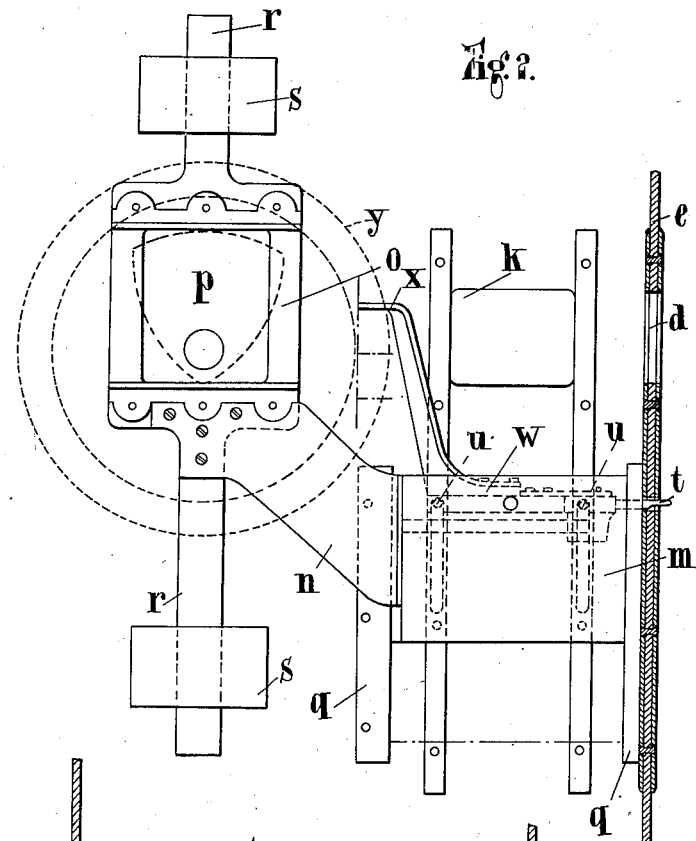
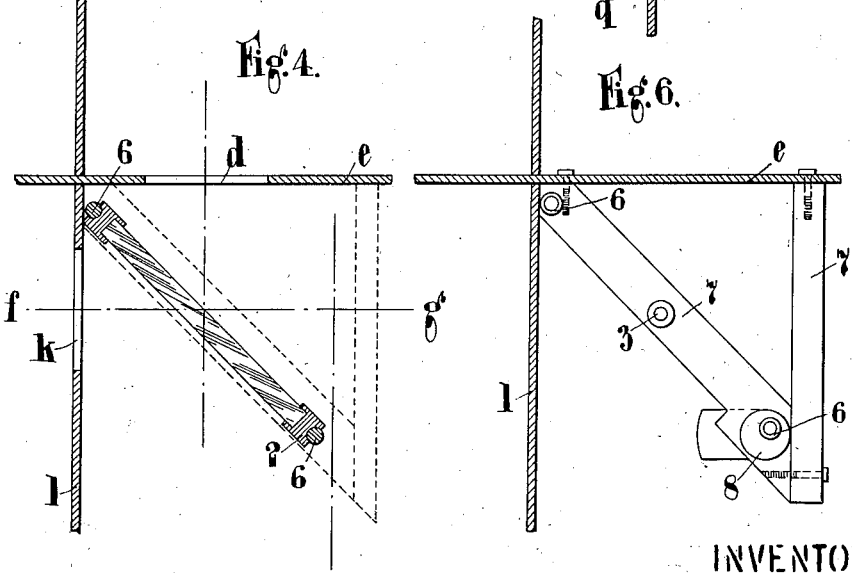
INVENTORS
A. Hamburger
W. E. L. Day
BY
H. R. Kerslake ATTORNEY

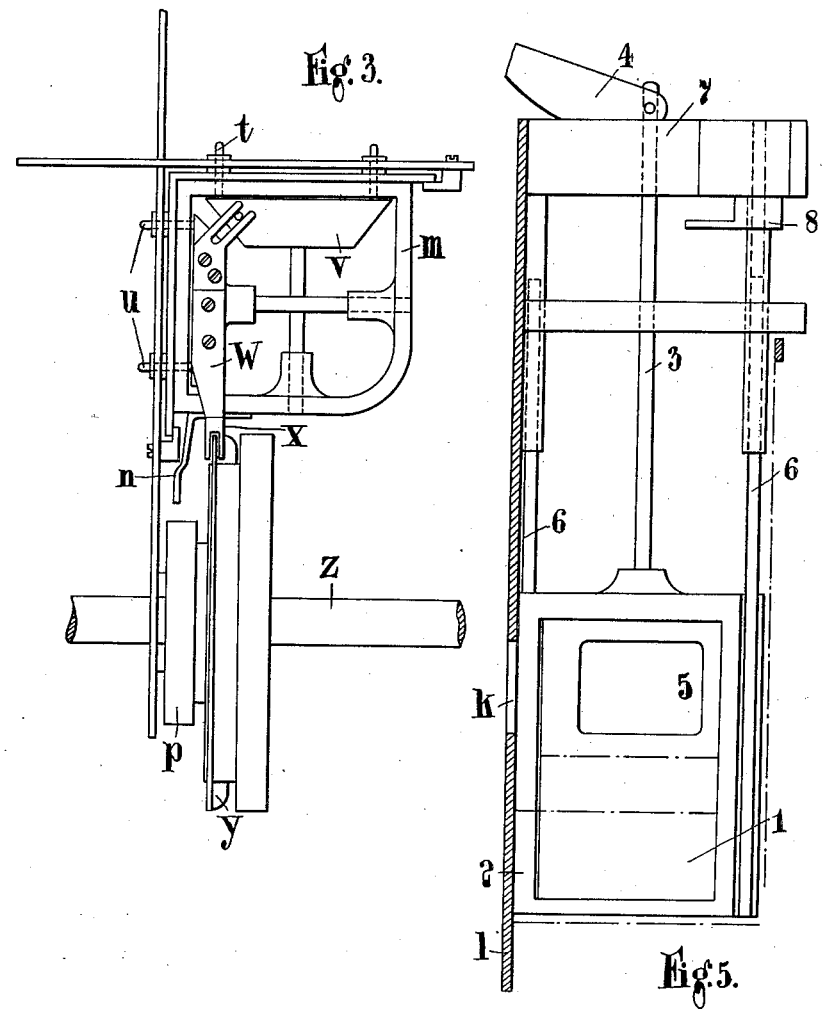

UNITED STATES PATENT OFFICE.

ARON HAMBURGER AND WILFRED ERNEST LYTTON DAY, OF LONDON, ENGLAND, ASSIGNORS TO HOLAM LIMITED, OF LONDON, ENGLAND.

APPARATUS FOR MAKING MULTICOLOR FILMS FOR CINEMATOGRAPHY.

1,332,828.  Specification of Letters Patent.  Patented Mar. 2, 1920.

Application filed November 25, 1919. Serial No. 340,613.

*To all whom it may concern:*

Be it known that we, ARON HAMBURGER, a citizen of the Republic of the United States of America, and residing at 51 Warwick street, Regent street, London, W. 1, England, and WILFRED ERNEST LYTTON DAY, a subject of the King of Great Britain and Ireland, and residing at 19 Lisle street, Wardour street, London, W. 1, England, have invented certain new and useful Improvements Relating to Apparatus for Making Multicolor Films for Cinematography, of which the following is a specification.

This invention relates to apparatus for obtaining negatives for multi-color cinematography.

It has been proposed to employ a suitable reflector which, when the exposure takes place through a single lens, allows light to pass through it and also reflects light in other directions, so that more than one film can be exposed simultaneously, the movement of the separate films being effected by two separate mechanisms geared together by bevel wheels. Now, a certain amount of blacklash with consequent lack of synchronism is inevitable in such an arrangement, but we have found it to be absolutely essential in obtaining good negatives for multicolor cinematography, to secure exact synchronization between the movements of the films, and it is the main object of the present invention to provide means achieving this result.

The invention consists in film moving mechanisms for two or more films, in which a pin and slot or equivalent connecting means is provided to interconnect the feed pin carriers, whereby accurate synchronism of the films' movements is effected.

The invention further consists in film moving mechanisms for two or more films, in which the pin carrying members are slidably mounted upon the same sliding block, motion being communicated between these members by a pin and slot or like connection.

The invention also consists in employing a movable reflection refraction element with a clear glass portion which can be brought into position for focusing.

Fig. 2 is a side view, and

Fig. 3 is a plan view showing the feed mechanism in detail.

Fig. 4 is a plan view showing the filter in position.

Fig. 5 is an elevation of the filter, and

Fig. 6 is a plan of the frame supporting the filter.

Figure 1:
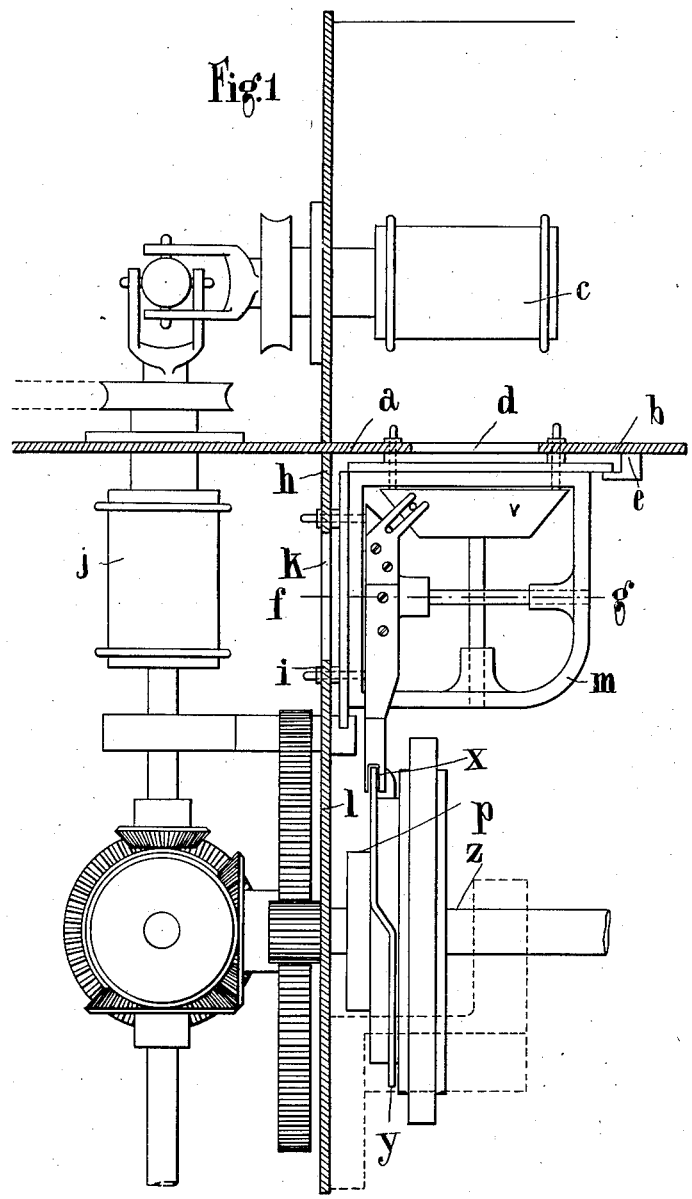
Figure 1 shows a plan view, with certain parts omitted for clearness, of one form of carrying our invention into effect.

In carrying this invention into effect in one form, as illustrated, by way of example in Figs. 1, 2 and 3 as applied to three color cinematography, a cinematograph camera is constructed on usual lines, but is provided with two film movements operating in planes at right angles to each other.

One plane is normal to the paper and passes through the line $a\ b$ and there are two films sensitive respectively to blue and green and arranged face to face which pass over the driving sprocket $c$ and are operated in this plane past the gate aperture $d$ in the gate $e$.

These two films receive the image reflected from a refraction-reflection element constructed as described in British Letters Patent No. 28722/12 interposed in the axis $f\ g$ of the beam of the lens, (see Figs. 4, 5 and 6).

The other plane is normal to the paper and passes through the line $h\ i$ and there is a single film which passes over driving sprocket $j$, and is operated in this plane past the gate aperture $k$ in the gate $l$.

This film receives through a red filter the refracted image preferably after correction.

The feeding mechanism consists of a guided sliding block $m$ shown in elevation in Fig. 2 and in plan in Figs. 1 and 3.

This block is connected by means of a rigid arm $n$ with a frame $o$ which receives a reciprocating motion by the uniform rotation of the cam $p$, suitable guides $q$ being provided for guiding the block $m$.

The frame $o$ carries extended tongues $r$ operating in guides $s$.

The sliding block $m$ carries two sets of feeding fingers $t$ and $u$ rigidly secured respectively to feeder plates $v$ and $w$.

The feeder plate $w$ carries a forked tongue $x$ which engages with a drunken cam $y$ mounted upon the shutter shaft $z$ and has a pin and slot connection with feeder plate $v$.

In operation, on rotation of shutter shaft z, the block m is reciprocated vertically by the action of cam p and at the same time the feeder plates v, w are reciprocated horizontally by the action of cam y.

The pins t and u are thus moved outward into engagement with the cinematograph films at the top of the travel of block m and retained in this position during the downward movement of the block.

At the bottom of the travel of block m the pins are withdrawn simultaneously and remain in this condition during the upward travel of the block at the termination of which the outward movement of the pins recurs.

By this means absolutely synchronous movement of the three films is insured and good registration obtained.

The refraction element is arranged for correction of the images in the way described in British Patent No. 28722 of 1912. The refraction reflection element carries on its rear face the suitable red color screen, conveniently of stained gelatin. This is indicated in Figs. 4, 5 and 6 in which 1 represents the refraction reflection element carried on slide 2 provided with an operating rod 3. This rod carries a cam 4 enabling it to be retained conveniently in the raised position with the filter 1 in position adjacent to the apertures k, d. The slide 2 is guided by rods 6 supported in a frame 7, adjustment being provided by an eccentric sleeve 8.

The upper part of the filter is provided with a clear glass window 5 to enable focusing to be effected.

The direct image may thus be readily focused without difficulty, and the color screen then moved into position for taking the negatives.

Having now described our invention, what we claim as new and desire to secure by Letters Patent is:—

1. A cinematographic apparatus comprising the combination of two film-feeding members, each carrying fingers capable of moving the film, a slotted element carried in a rigid manner by one of said members and a pin carried by the other of said members, said slotted member engaging said pin, to effect transverse movement of the pin-bearing member by a similar movement of the member carrying said slotted element, and means for simultaneously moving said two members longitudinally to feed the said film.

2. A cinematographic apparatus including in combination, a sliding block, two separate film-feeding members carried thereupon, means for reciprocating said sliding block, a sliding connection between said feeding members, and means for maintaining said feeding members in fixed longitudinal position relatively to each other.

3. A film-moving mechanism for a plurality of films, operating in mutually inclined planes, including a sliding block, and means for reciprocating the same, a plurality of feeding members slidably mounted thereon, means for reciprocating one of said feeding members, and sliding means for imparting to one feeding member the motion of another feeding member.

In testimony whereof we have signed our names to this specification.

ARON HAMBURGER.
WILFRED ERNEST LYTTON DAY.